(12) United States Patent
Kim et al.

(10) Patent No.: US 12,212,701 B2
(45) Date of Patent: Jan. 28, 2025

(54) WINDOW AND ELECTRONIC DEVICE INCLUDING THE SAME

(71) Applicant: Samsung Display Co., Ltd., Yongin-si (KR)

(72) Inventors: Kyung-Man Kim, Anyang-si (KR); Minsang Koo, Seongnam-si (KR); Sanghoon Kim, Hwaseong-si (KR); Yuri Kim, Guri-si (KR); Min-Hoon Choi, Seoul (KR); Seongjin Hwang, Suwon-si (KR)

(73) Assignees: SAMSUNG DISPLAY CO., LTD.; KILE PARK REED & HOUTTEMAN PLLC

( * ) Notice: Subject to any disclaimer, the term of this patent is extended or adjusted under 35 U.S.C. 154(b) by 121 days.

(21) Appl. No.: 17/527,630

(22) Filed: Nov. 16, 2021

(65) Prior Publication Data
US 2022/0256018 A1 Aug. 11, 2022

(30) Foreign Application Priority Data
Feb. 9, 2021 (KR) .................... 10-2021-0018482

(51) Int. Cl.
*H04M 1/02* (2006.01)
(52) U.S. Cl.
CPC ....... *H04M 1/0216* (2013.01); *H04M 1/0268* (2013.01)
(58) Field of Classification Search
CPC ............ H04M 1/0216; H04M 1/0268; H04M 1/1652; H04M 1/0235; H04M 1/0277; H04M 2201/38; H04M 1/0022; H04M 1/0222; H04M 1/0225; H04M 1/0227; H04M 1/0229; H04M 1/0231; H04M 1/0233; G06F 1/1652; G06F 1/1643; G06F 1/1624; G06F 1/1616
See application file for complete search history.

(56) References Cited

U.S. PATENT DOCUMENTS

| | | | | |
|---|---|---|---|---|
| 10,020,462 B1 * | 7/2018 | Ai | ............... | H10K 50/841 |
| 10,416,721 B2 * | 9/2019 | Shin | ............... | G09F 9/301 |
| 10,845,848 B2 * | 11/2020 | Jones | ............... | G06F 1/1652 |
| 11,029,724 B2 * | 6/2021 | Hong | ............... | H10K 50/844 |
| 11,758,752 B2 * | 9/2023 | Hyun | ............... | H10K 50/841 257/88 |
| 12,007,805 B2 * | 6/2024 | Liu | ............... | G06F 1/1616 |

(Continued)

FOREIGN PATENT DOCUMENTS

KR 10-2146730 8/2020

Primary Examiner — Angelica Perez
(74) Attorney, Agent, or Firm — KILE PARK REED & HOUTTEMAN PLLC

(57) ABSTRACT

An electronic device and a window include a folding part, and a first non-folding part and a second non-folding part spaced apart from each other with the folding part disposed between the first non-folding part and the second non-folding part, wherein the folding part includes a base portion, main protruding portions disposed on the base portion, each of the main protruding portions having a first thickness, and spaced apart from each other, and at least one sub-protruding portion having a second thickness less than the first thickness of each of the main protruding portions and disposed between the main protruding portions on the base portion.

29 Claims, 12 Drawing Sheets

(56) References Cited

U.S. PATENT DOCUMENTS

| | | | | |
|---|---|---|---|---|
| 2007/0194679 A1* | 8/2007 | Jo | ............................. | H01J 11/10 |
| | | | | 313/112 |
| 2010/0186806 A1* | 7/2010 | Morikawa | ................ | H02S 40/42 |
| | | | | 136/256 |
| 2014/0042406 A1* | 2/2014 | Degner | ................. | H10K 59/131 |
| | | | | 438/34 |
| 2014/0346474 A1* | 11/2014 | Jeong | ...................... | H10K 50/84 |
| | | | | 257/40 |
| 2015/0049428 A1* | 2/2015 | Lee | ........................ | G06F 1/1652 |
| | | | | 361/679.27 |
| 2017/0060188 A1* | 3/2017 | Han | ........................ | G06F 1/1641 |
| 2018/0175310 A1* | 6/2018 | Lee | ........................ | H10K 50/844 |
| 2018/0341293 A1* | 11/2018 | Kim | ........................ | G06F 1/1652 |
| 2018/0375064 A1* | 12/2018 | Jeon | ..................... | H10K 77/111 |
| 2019/0005857 A1* | 1/2019 | Wakata | ................... | H10K 59/00 |
| 2019/0340974 A1* | 11/2019 | Ka | ......................... | G09G 3/3275 |
| 2019/0346887 A1* | 11/2019 | Park | ....................... | G06F 1/1681 |
| 2020/0056056 A1* | 2/2020 | Ahn | ...................... | C09D 163/00 |
| 2020/0166971 A1* | 5/2020 | Lee | ....................... | G06F 1/1624 |
| 2021/0072797 A1* | 3/2021 | He | ......................... | G06F 1/1652 |
| 2021/0191467 A1* | 6/2021 | Sunwoo | .................. | C03C 15/00 |

* cited by examiner

WINDOW AND ELECTRONIC DEVICE INCLUDING THE SAME

CROSS-REFERENCE TO RELATED APPLICATION(S)

This application claims priority to and benefits of Korean Patent Application No. 10-2021-0018482 under 35 U.S.C. § 119, filed on Feb. 9, 2021 in the Korean Intellectual Property Office, the entire contents of which are incorporated herein by reference.

BACKGROUND

1. Technical Field

The disclosure herein relates to a window and an electronic device including the same, and, to a foldable window and an electronic device including the same.

2. Description of the Related Art

Electronic devices having various shapes are used to provide image information, and display devices including a foldable or bendable flexible display panel are recently developed. A flexible display device may be variously changed in shape such as being folded or rolled unlike a rigid display device, and thus may be carried regardless of a displayed screen size.

This flexible display device requires a window for protecting the display panel while not disrupting a folding or bending operation, and thus a window having an excellent folding characteristic while not degrading a mechanical property thereof is in demand.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

The disclosure provides a window having an excellent folding characteristic and an excellent mechanical property.

The disclosure also provides an electronic device including a window having an excellent folding characteristic and an improved impact resistance against an external impact.

An embodiment provides a window that may include a folding part extending in a first direction; and a first non-folding part and a second non-folding part spaced apart from each other with the folding part disposed between the first non-folding part and the second non-folding part in a second direction perpendicular to the first direction, in which the folding part may include a base portion; main protruding portions disposed on the base portion, each of the main protruding portions having a first thickness, and spaced apart from each other in the second direction; and at least one sub-protruding portion having a second thickness less than the first thickness of each of the main protruding portions and disposed between the main protruding portions on the base portion.

In an embodiment, each of the main protruding portions may include on a cross-section perpendicular to the base portion a base surface adjacent to the base portion; a flat surface facing the base surface and parallel to the base portion; and a side surface disposed between the base surface and the flat surface.

In an embodiment, a width of each of the main protruding portions in the second direction may decrease in a direction from the base surface to the flat surface on the cross-section perpendicular to the base portion.

In an embodiment, the flat surface of each of the main protruding portions may have an extension direction parallel to the first direction on a plane parallel to the base portion.

In an embodiment, an inclination angle of the side surface with respect to a virtual reference line passing an edge of the flat surface may be in a range of about 0° to about 60°.

In an embodiment, one of the at least one sub-protruding portion may be disposed between neighboring main protruding portions of the main protruding portions, and a spaced distance between the main protruding portions in the second direction may be in a range of about 20 μm to about 300 μm.

In an embodiment, the at least one sub-protruding portion may include an upper portion that that forms a vertex in a direction away from the base portion.

In an embodiment, a recessed portion between neighboring main protruding portions of the main protruding portions may be symmetrical to a virtual line passing the upper portion of the at least one sub-protruding portion.

In an embodiment, a maximum width of the at least one sub-protruding portion in the second direction may be in a range of about 1 μm to about 100 μm on a cross-section perpendicular to the base portion.

In an embodiment, the non-folding part may have a thickness equal to a sum of a thickness of the base portion and a thickness of one of the main protruding portions.

In an embodiment, the base portion may have a thickness in a range of about 1 μm to about 50 μm.

In an embodiment, a ratio between the first thickness of each of the main protruding portions and the second thickness of the at least one sub-protruding portion may be in a range of about 1:0.3 to about 1:0.8.

In an embodiment, at least one sub-protruding portion may include sub-protruding portions that may be disposed between neighboring main protruding portions of the main protruding portions, and all of the sub-protruding portions may have an identical shape on a cross-section perpendicular to the base portion, or at least one of the sub-protruding portions may have a shape different from that of each of the remaining sub-protruding portions on a cross-section perpendicular to the base portion.

In an embodiment, a spaced distance between the sub-protruding portions in the second direction may be in a range of about 1 μm to about 100 μm.

In an embodiment, the sub-protruding portions may include a first sub-protruding portion disposed between a first main protruding portion and a second main protruding portion neighboring each other; a second sub-protruding portion disposed between the first main protruding portion and the first sub-protruding portion; and a third sub-protruding portion disposed between the second main protruding portion and the first sub-protruding portion, wherein the second sub-protruding portion and the third sub-protruding portion may be symmetrical to each other with respect to the first sub-protruding portion.

In an embodiment, a width of the folding part in the second direction in a plan view may be equal to or greater than about π×r, where the r is a radius of curvature of the folding part.

In an embodiment, an electronic device may include a display module including a folding display part extending in a first direction; a first non-folding display part and a second non-folding display part spaced apart from each other with the folding display part disposed between the first non-folding display part and the second non-folding display part in a second direction perpendicular to the first direction; and a window disposed on the display module, the window including a folding part corresponding to the folding display part of the display module, and a first non-folding part and a second non-folding part spaced apart from each other with the folding part disposed between the first non-folding display part and the second non-folding display part, wherein the folding part may include a base portion; main protruding portions protruding from the base portion to the display module, each of the main protruding portions having a first thickness, and spaced apart from each other in the second direction; and at least one sub-protruding portion having a second thickness less than the first thickness of each of the main protruding portions, protruding from the base portion to the display module, and disposed between the main protruding portions.

In an embodiment, the electronic device may further include an adhesive layer that fills a space between the display module and the window.

In an embodiment, a distance between top surfaces of the window facing each other may be less than a distance between top surfaces of the display module facing each other in case that the display module and the window are folded.

In an embodiment, the first non-folding part and the second non-folding part may face each other with the folding part disposed between the first non-folding part and the second non-folding part in case that the display module and the window are folded, and the folding part may have a radius of curvature of about 1 mm or more.

In an embodiment, each of the main protruding portions may include on a cross-section perpendicular to the base portion a base surface adjacent to the base portion; a flat surface facing the base surface and parallel to the base portion; and a side surface disposed between the base surface and the flat surface, in which the flat surface may be adjacent to the display module.

In an embodiment, the non-folding part may have a thickness equal to a sum of a thickness of the base portion and a thickness of one of the main protruding portions.

In an embodiment, the folding part may include a recessed part recessed in a direction away from a surface of the window which is adjacent to the display module, and formed by the main protruding portions and the at least one sub-protruding portion.

BRIEF DESCRIPTION OF THE DRAWINGS

The accompanying drawings are included to provide a further understanding of the disclosure, and are incorporated in and constitute a part of this specification. The drawings illustrate embodiments and, together with the description, serve to explain principles of the disclosure. In the drawings.

DETAILED DESCRIPTION OF THE EMBODIMENTS

Figure 1A:
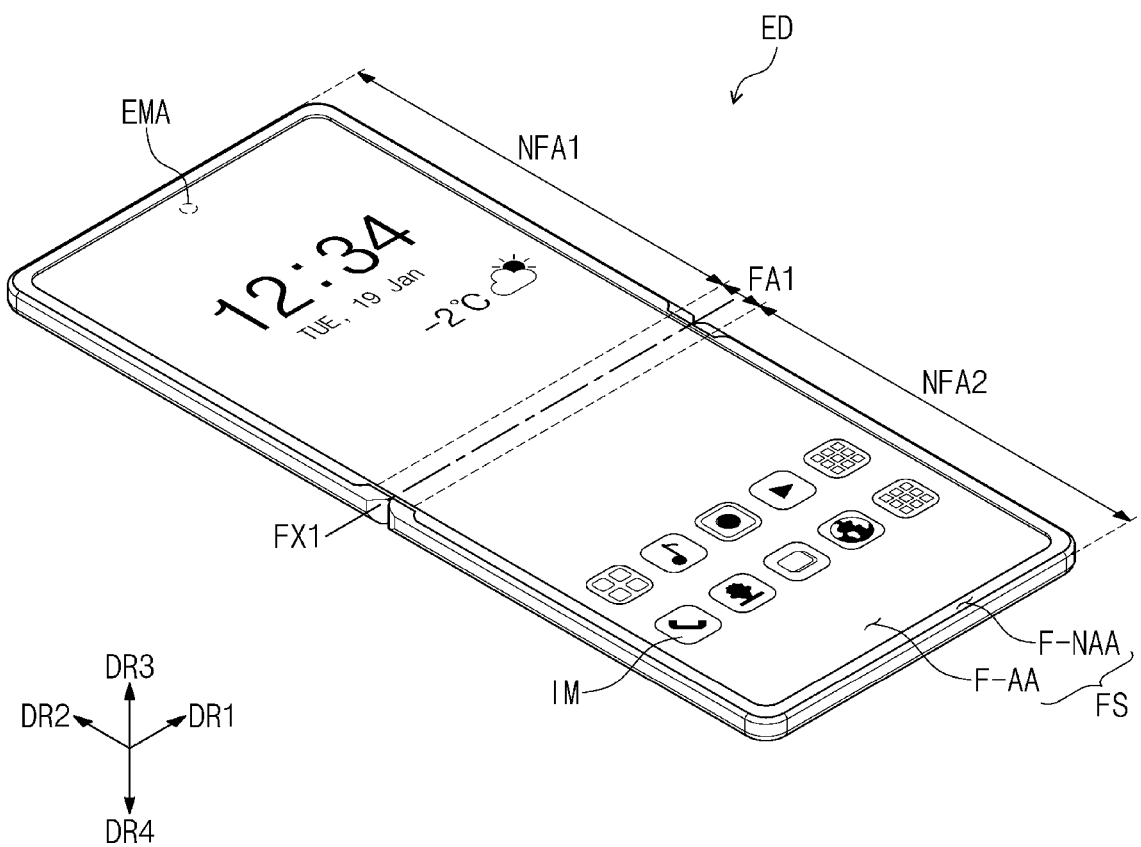
FIG. 1A is a schematic perspective view illustrating an unfolded state of an electronic device according to an embodiment.

Since the disclosure may have diverse modified embodiments, embodiments are illustrated in the drawings and are described in the detailed description. However, this does not limit the disclosure within described embodiments and it should be understood that the disclosure covers all of the modifications, equivalents, and replacements within the scope of the disclosure.

In this specification, it will also be understood that when one component (or region, layer, portion) is referred to as being 'on', 'connected to', or 'coupled to' another component, it can be directly disposed/connected/coupled on/to the one component, or an intervening third component may also be present.

It will be understood that the terms "connected to" or "coupled to" may include a physical or electrical connection or coupling.

In this application, it will be understood that when a layer, a film, a region, or a plate is referred to as being "directly disposed on" another layer, film, region, or plate, further another layer, film, region, or plate may not be present therebetween. For example, a feature of being "directly disposed" may represent that two layers or two members are disposed without using an additional member such as an adhesive member therebetween.

Like reference numerals refer to like elements throughout. Also, in the drawings, the thickness, ratio, and dimensions of components are exaggerated to effectively describe technical features.

The term "and/or" includes any and all combinations of one or more of the associated listed items. In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

It will be understood that although the terms such as 'first' and 'second' are used herein to describe various elements, these elements should not be limited by these terms. The terms are only used to distinguish one component from other components. For example, a first element referred to as a first element in one embodiment can be referred to as a second element in another embodiment without departing from the scope of the appended claims. The terms of a singular form may include plural forms unless referred to the contrary.

Also, terms such as "under", "below", "above", "upper", and the like are used for explaining a relation association of components illustrated in the drawings. The terms may be a relative concept and described based on directions expressed in the drawings but are not limited thereto. In this specification, a feature of being "disposed on" may also represent a case when one component is disposed below another component in addition to a case when one component is disposed on another component.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

When an element is described as 'not overlapping' or 'to not overlap' another element, this may include that the elements are spaced apart from each other, offset from each other, or set aside from each other or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms (including technical and scientific terms) used herein have the same meaning as generally understood by those skilled in the art. Also, terms as defined in a commonly used dictionary should be construed as having the same meaning as in an associated technical context, and unless defined otherwise in the description, the terms are not ideally or excessively construed as having a formal meaning.

The terms "comprises," "comprising," "includes," and/or "including,", "has," "have," and/or "having," and variations thereof when used in this specification, specify the presence of stated features, integers, steps, operations, elements, components, and/or groups thereof, but do not preclude the presence or addition of one or more other features, integers, steps, operations, elements, components, and/or groups thereof.

The phrase "in a plan view" means viewing the object from the top, and the phrase "in a schematic cross-sectional view" means viewing a cross-section of which the object is vertically cut from the side.

Hereinafter, a window and an electronic device according to an embodiment will be described with reference to the accompanying drawings.

Figure 1B:
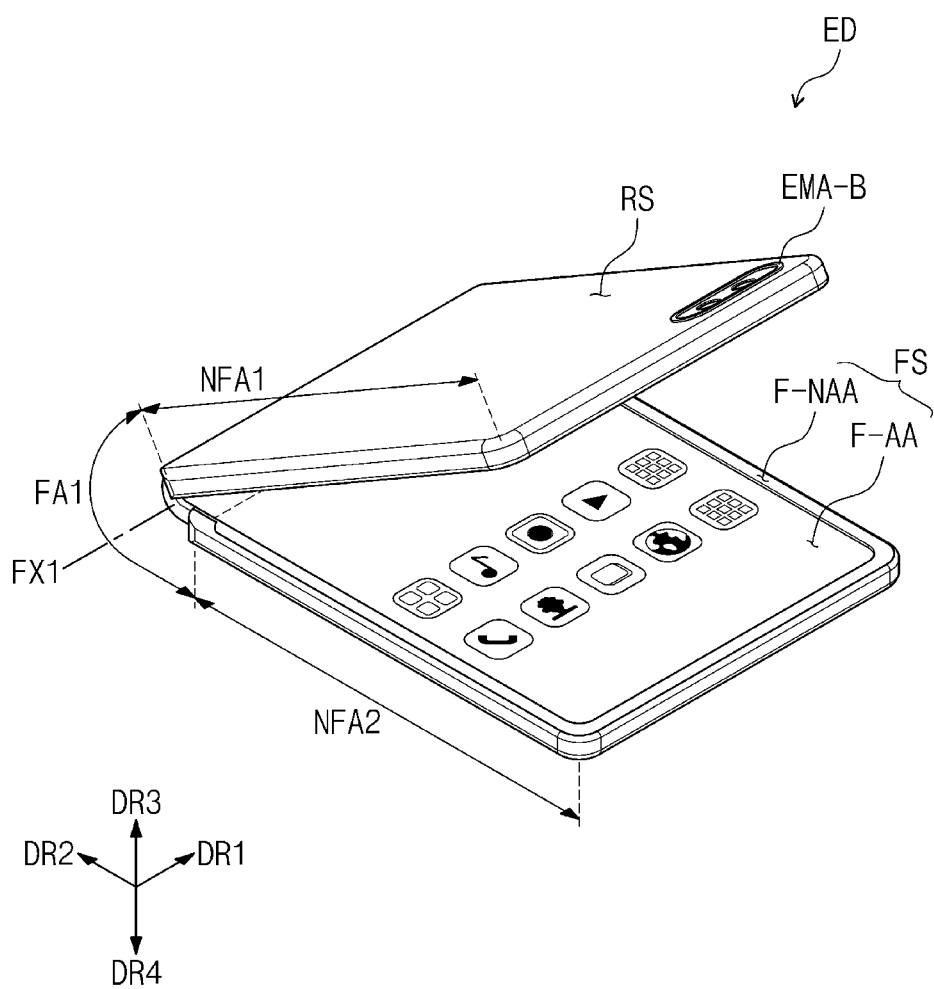
FIG. 1B is a schematic perspective view illustrating an in-folding process of the electronic device in FIG. 1A.

FIG. 1A is a schematic perspective view illustrating an unfolded state of an electronic device according to an embodiment. FIG. 1B is a schematic perspective view illustrating an in-folding process of the electronic device in FIG. 1A. An electronic device ED according to an embodiment may be activated by an electrical signal. Although the electronic device ED may be, for example, a mobile phone, a tablet computer, a navigation unit for a vehicle, a game console, or a wearable device, an embodiment is not limited thereto. In this specification including FIG. 1A, a mobile phone is illustrated as an example of the electronic device ED.

Although a first directional axis DR1 to a fourth directional axis DR4 are illustrated in FIG. 1A and drawings below, directions indicated by the first to fourth directional axes DR1, DR2, DR3, and DR4, as relative concepts, may be converted with respect to each other. Also, directions indicated by the first to fourth directional axes DR1, DR2, DR3, and DR4 may be described as first to fourth directions and designated by the same reference numerals.

Referring to FIGS. 1A and 1B, the electronic device ED according to an embodiment may include a display surface FS defined by the first directional axis DR1 and the second directional axis DR2 crossing or intersecting the first directional axis DR1. The electronic device ED may provide an image IM to a user through the display surface FS. The electronic device ED according to an embodiment may display the image IM in a direction of the third directional axis DR3 to the display surface FS parallel to each of the first directional axis DR1 and the second directional axis DR2. In this specification, a front surface (or top surface) and a rear surface (or bottom surface) of each of members are defined based on a direction in which the image IM is displayed. In this specification, the direction in which the image IM is displayed may be defined as the direction of the third directional axis DR3, and a direction of the fourth directional axis DR4 may be defined as a direction opposing to the direction of the third directional axis DR3.

The electronic device ED according to an embodiment may sense an external input applied from the outside. The external input may include various types of inputs provided from the outside of the electronic device ED. For example, the external input may include a contact that is generated by a portion of a user's body such as hands and an external input (for example, hovering) that is applied by being adjacent to the electronic device ED or being disposed adjacent by a distance. Also, the external input may have various types such as a force, a pressure, a temperature, and light, by way of example.

The display surface FS of the electronic device ED may include an active area F-AA and a peripheral area F-NAA. The active area F-AA may be activated by an electrical signal. The electronic device ED according to an embodiment may display the image IM through the active area F-AA. Also, the active area F-AA may sense various types of external inputs. The peripheral area F-NAA is disposed adjacent to the active area F-AA. The peripheral area F-NAA may have a color. The peripheral area F-NAA may surround the active area F-AA or may be adjacent to the active area F-AA. Thus, the active area F-AA may have a shape that is substantially defined by the peripheral area F-NAA. However, this is merely an example. For example, the peripheral area F-NAA may be disposed adjacent to only one side or a side of the active area F-AA or omitted. The electronic device ED according to an embodiment may include active areas having various shapes. However, an embodiment is not limited thereto.

The electronic device ED may include a folding area FA1 and non-folding areas NFA1 and NFA2. The electronic device ED may include non-folding areas NFA1 and NFA2. The electronic device ED according to an embodiment may include a first non-folding area NFA1 and a second non-folding area NFA2 with the folding area FA1 therebetween. Although an embodiment of the electronic device ED including one folding area FA1 is illustrated in FIGS. 1A and 1B, an embodiment is not limited thereto. For example, folding areas may be defined on the electronic device ED.

Referring to FIG. 1B, the electronic device ED according to an embodiment may be folded with respect to a first folding axis FX1. The first folding axis FX1, as a virtual axis extending in the direction of the first directional axis DR1, may be parallel to a short-side direction of the electronic device ED. The folding axis FX1 may extend along the first directional axis DR1 on the display surface FS.

In an embodiment, the non-folding areas NFA1 and NFA2 may be disposed adjacent to the folding area FA1 with the folding area FA1 therebetween. For example, the first non-folding area NFA1 may be disposed at one side or a side of the folding area FA1 in the second direction DR2, and the second non-folding area NFA2 may be disposed at the other side or another side of the folding area FA1 in the second direction DR2.

The electronic device ED may be folded with respect to the first folding axis FX1 and deformed into an in-folding state in which one area or an area overlapping the first non-folding area NFA1 faces the other area overlapping the second non-folding area NFA2.

However, an embodiment is not limited thereto. For example, the electronic device according to an embodiment may be folded with respect to folding axes so that portions of the display surface FS face each other, and the number of the folding axes and the number of the non-folding areas are not particularly limited.

The active area F-AA may include an electronic module area EMA. Various electronic modules may be disposed on the electronic module area EMA. For example, the electronic module may include at least one of a camera, a speaker, an optical detection sensor, and a thermal detection sensor. The electronic module area EMA may sense an external subject received through the display surface FS or provide a sound signal such as a voice to the outside through the display surface FS. The electronic module may include components. However, an embodiment is not limited to the components of the electronic module.

The electronic module area EMA may be surrounded by the active area F-AA and the peripheral area F-NAA. However, an embodiment is not limited thereto. For example, the electronic module area EMA may be disposed in the active area F-AA, and is not limited to any embodiment.

Also, the electronic device ED according to an embodiment may further include an electronic module area EMA-B disposed on a rear surface RS thereof. A camera, a speaker, an optical detection sensor, or the like may be disposed on the electronic module area EMA-B disposed on the rear surface RS.

Figure 1C:
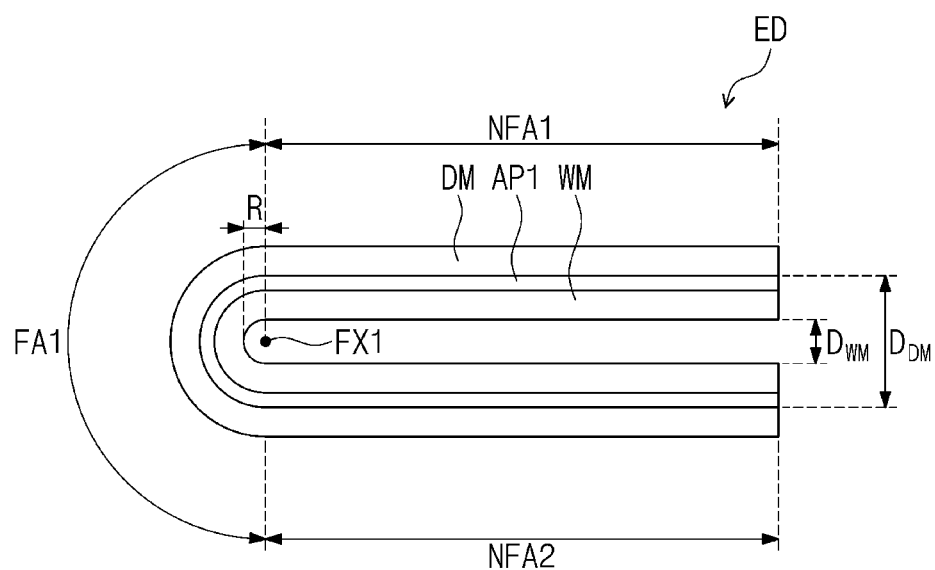
FIG. 1C is a schematic cross-sectional view illustrating the folded electronic device according to an embodiment.

FIG. 1C is a schematic cross-sectional view illustrating a folded state of the electronic device ED according to an embodiment. In the folded state of the electronic device ED according to an embodiment, a distance $D_{WM}$ between top surfaces, which face each other, of a window WM may be less than a distance $D_{DM}$ between top surfaces, which face each other, of a display module DM. In the electronic device ED according to an embodiment, a radius R of curvature of the folding area FA1 based on the first folding axis FX1 may be about 1 mm or more.

Figure 2A:
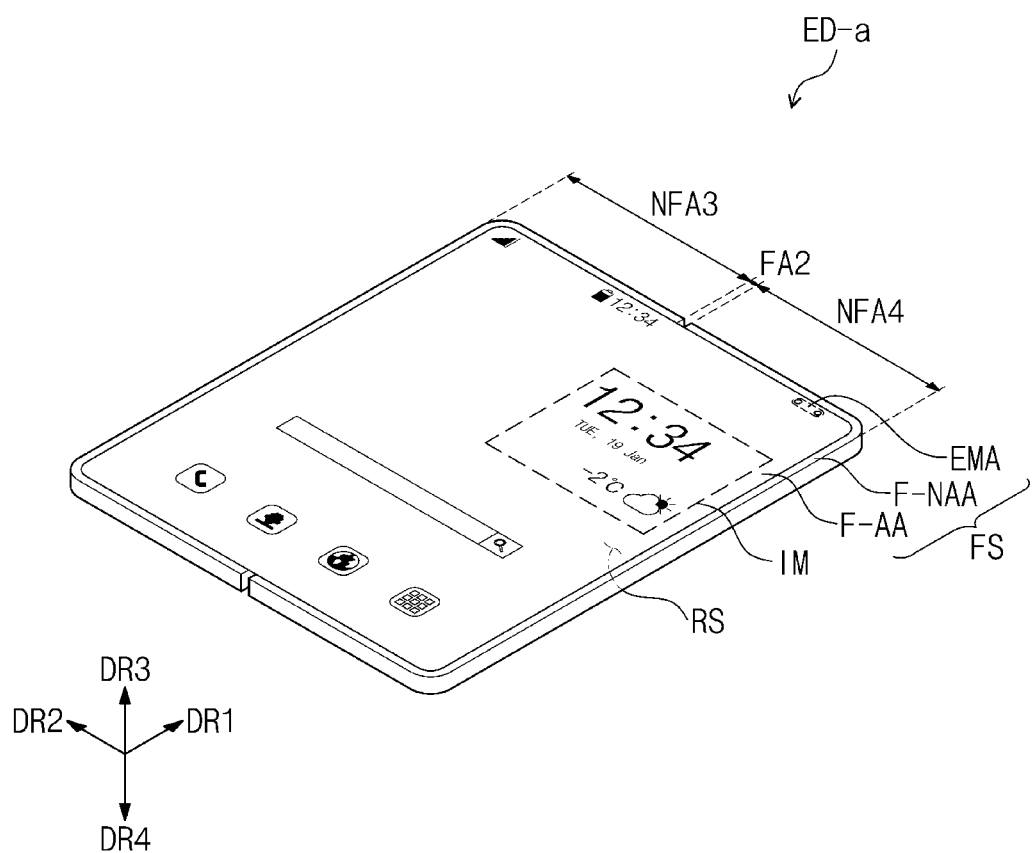
FIG. 2A is a schematic perspective view illustrating an unfolded state of an electronic device according to an embodiment.
Figure 2B:
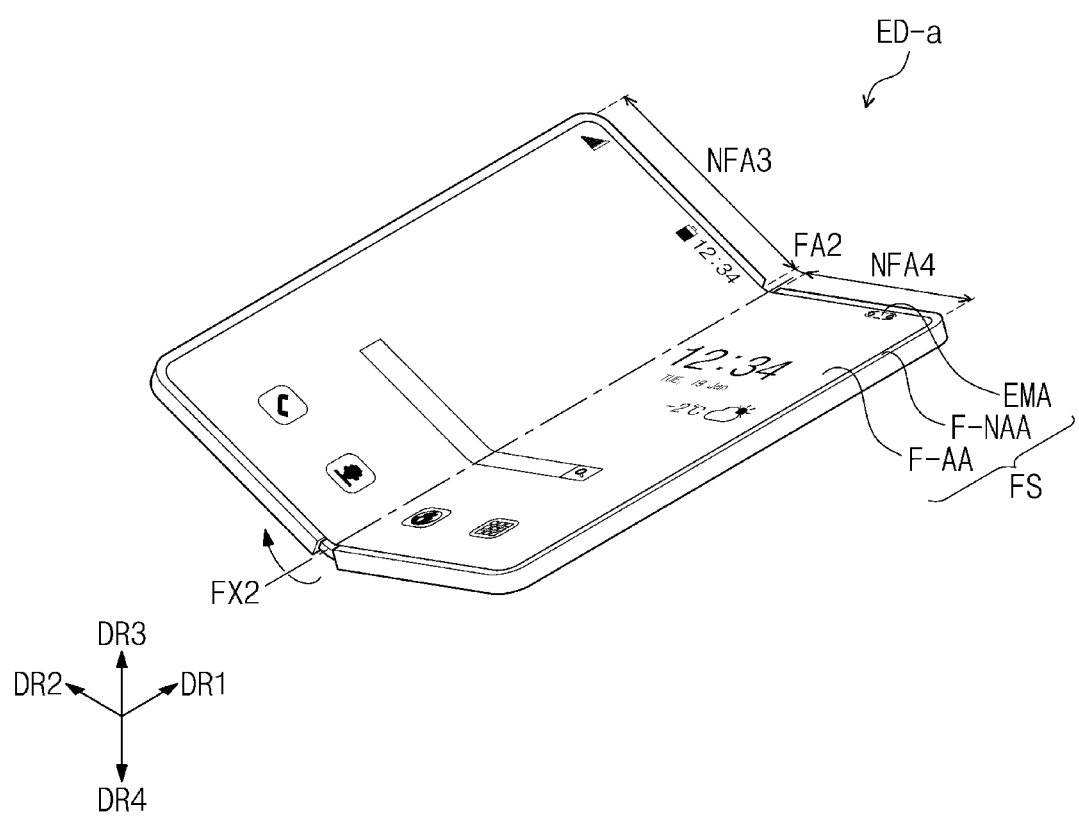
FIG. 2B is a schematic perspective view illustrating an in-folding process of the electronic device in FIG. 2A.

FIG. 2A is a schematic perspective view illustrating an unfolded state of an electronic device according to an embodiment. FIG. 2B is a schematic perspective view illustrating an in-folding process of the electronic device in FIG. 2A.

An electronic device ED-a according to an embodiment may be folded with respect to a second folding axis FX2 extending in one direction or a direction parallel to the first directional axis DR1. In FIG. 2B, an extension direction of the second folding axis FX2 is parallel to an extension direction of a long side of the electronic device ED-a. However, an embodiment is not limited thereto.

The electronic device ED-a according to an embodiment may include at least one folding area FA2 and non-folding areas NFA3 and NFA4 disposed adjacent to the folding area FA2. The non-folding areas NFA3 and NFA4 may be spaced apart from each other with the folding area FA2 therebetween.

The folding area FA2 has a curvature and a radius of curvature. In an embodiment, the first non-folding area NFA3 and the second non-folding area NFA4 may face each other, and the electronic device ED-a may be in-folded so that a display surface FS is not exposed to the outside.

In an embodiment, in an unfolded state of the electronic device ED-a, the display surface FS may be seen by a user. As described in the electronic device ED according to an embodiment described with reference to FIGS. 1A and 1B, the display surface FS of the electronic device ED-a according to an embodiment may include an active area F-AA and a peripheral area F-NAA. Also, the display surface FS of the electronic device ED-a may include an electronic module area EMA.

Also, in an in-folded state of the electronic device ED-a according to an embodiment, a rear surface RS may be seen by the user. For example, the rear surface RS may function as a second display surface for displaying a picture or an image. Also, an electronic module area on which an electronic module including various components is disposed may be disposed on the rear surface RS.

Figure 3:
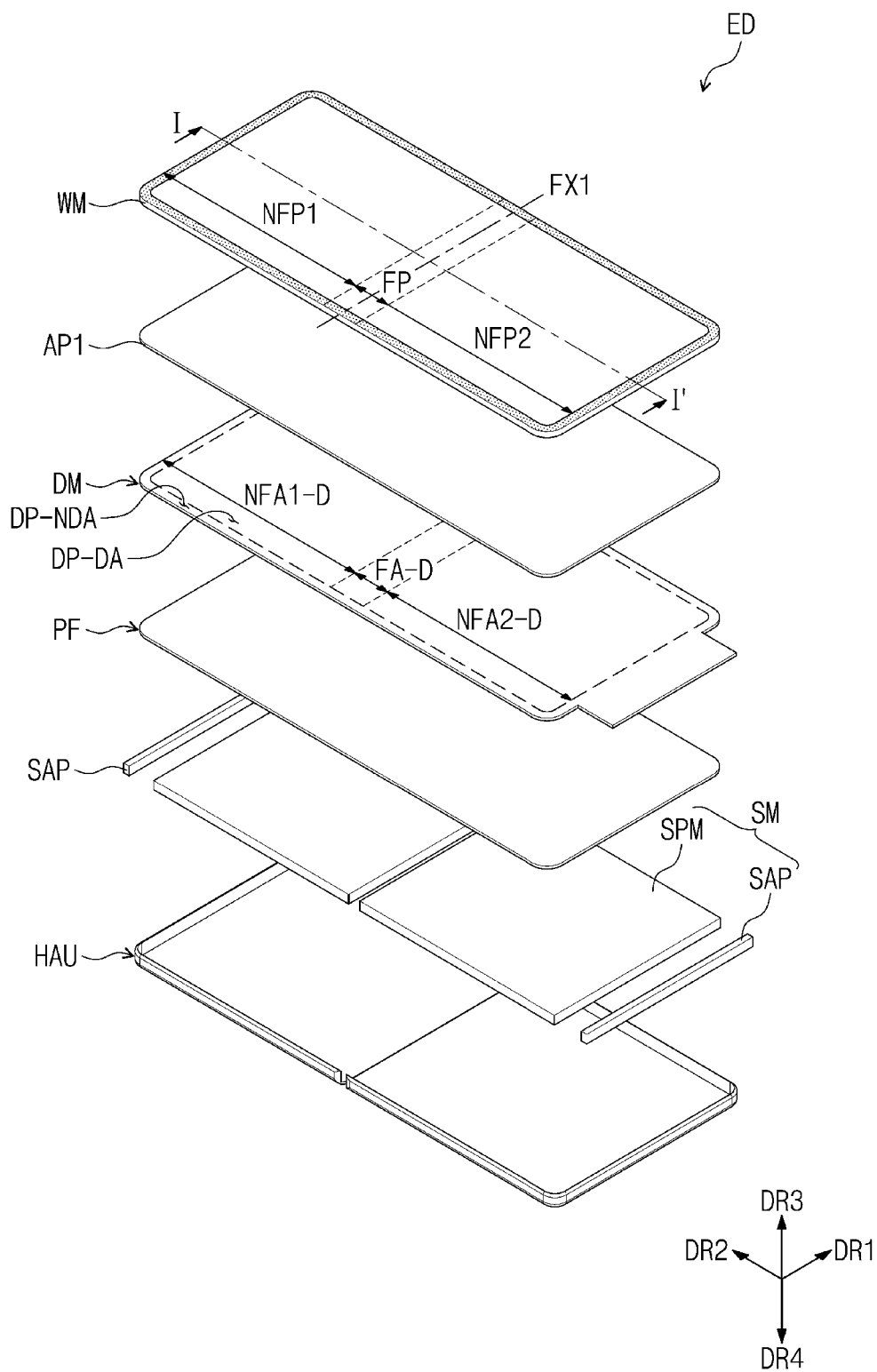
FIG. 3 is an exploded perspective view of the electronic device according to an embodiment.
Figure 4:
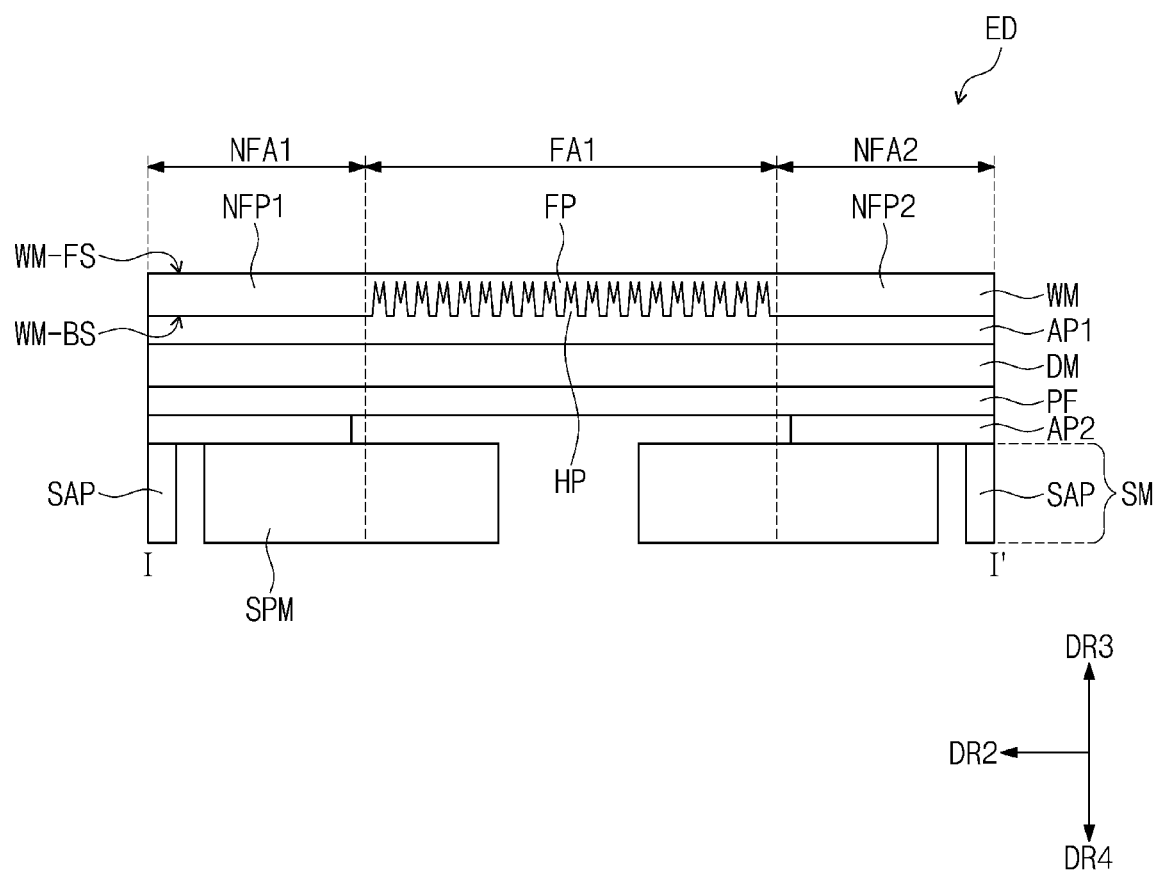
FIG. 4 is a schematic cross-sectional view illustrating the electronic device according to an embodiment.

FIG. 3 is an exploded perspective view illustrating the electronic device according to an embodiment, and FIG. 4 is a schematic cross-sectional view illustrating the electronic device according to an embodiment. FIG. 3 is an exploded perspective view illustrating the electronic device according to an embodiment in FIG. 1A. FIG. 4 is a schematic cross-sectional view taken along line I-I' of FIG. 3.

Referring to FIGS. 3 and 4, the electronic device ED according to an embodiment may include a display module DM and a window WM disposed on the display module DM. Also, the electronic device ED according to an embodiment may further include an adhesive layer AP1 disposed between the display module DM and the window WM. The electronic device ED according to an embodiment may include a lower module SM and a protection layer PF, which are disposed below the display module DM.

The window WM may cover or overlap an entire outer side of the display module DM. The window WM may have a shape corresponding to or substantially corresponding to that of the display module DM. Also, the electronic device ED may include a housing HAU for accommodating the display module DM, the lower module SM, and the like within the spirit and the scope of the disclosure. The housing HAU may be connected or coupled with the window WM.

Although not shown, the housing HAU may further include a hinge structure for readily folding or bending.

In the electronic device ED according to an embodiment, the window WM may include an optically clear insulating material. The window WM may be a glass substrate or a polymer substrate. For example, the window WM may be a tempered glass substrate that is subject to a strengthening treatment.

In the electronic device ED according to an embodiment, the adhesive layer AP1 disposed between the window WM and the display module DM may fill a space between the window WM and the display module DM. The adhesive layer AP1 may fill a space between patterns provided or disposed on one surface or a surface of the window WM.

The adhesive layer AP1 may be an optically clear adhesive film (OCA) or an optically clear adhesive resin layer (OCR). As an example, in an embodiment, the adhesive layer AP1 may be omitted.

The display module DM may display an image by an electrical signal and transceive information on an external input. The display module DM may include a display area DP-DA and a non-display area DP-NDA. The display area DP-DA may be defined as an area emitting an image provided from the display module DM.

The non-display area DP-NDA is disposed adjacent to the display area DP-DA. For example, the non-display area DP-NDA may surround or may be adjacent to the display area DP-DA. However, this is merely an example. The non-display area DP-NDA may have various shapes. However, an embodiment is not limited to the shape of the non-display area DP-NDA. According to an embodiment, the display area DP-DA of the display module DM may correspond to at least a portion of the active area F-AA (refer to FIG. 1A). Although not shown, the display module DM may include a display panel (not shown) and an input sensor (not shown) disposed on the display panel (not shown).

The display module DM may include a folding display part FA-D and non-folding display parts NFA1-D and NFA2-D. The folding display part FA-D may correspond to the folding area FA1 (refer to FIG. 1A), and the non-folding display parts NFA1-D and NFA2-D may correspond to the non-folding areas NFA1 and NFA2 (refer to FIG. 1A).

The folding display part FA-D may be folded or bent with respect to the first folding axis FX1 extending in the direction of the first directional axis DR1. The display module DM may include a first non-folding display part NFA1-D and a second non-folding display part NFA1-D, and the first non-folding display part NFA1-D and the second non-folding display part NFA1-D may be spaced apart from each other with the folding display part FA-D therebetween. The first non-folding display part NFA1-D and the second non-folding display part NFA1-D may be spaced apart from each other with the folding display part FA-D therebetween in a direction of the second directional axis DR2.

In the electronic device ED according to an embodiment, the lower module SM may include a support member SPM and a filling part SAP. The support member SPM may overlap a most portion of the display module DM. The filling part SAP may be disposed at an outer side of the support member SPM and overlap an outer portion of the display module DM.

The support member SPM may include at least one of a support plate, a cushion layer, a shielding layer, and an interlayer adhesive layer, which are made of a metal material or a polymer material. The support member SPM may support the display module DM or prevent the display module DM from being deformed by an external impact or force.

The cushion layer may include an elastomer such as a sponge, a foam, or a urethane resin. Also, the cushion layer may include at least one of an acrylic-based polymer, a silicon-based polymer, and an imide-based polymer. The shielding layer may be an electromagnetic wave shielding layer or a heat dissipation layer. Also, the shielding layer functions as an adhesive layer. The interlayer adhesive layer may be provided in the form of an adhesive resin layer or an adhesive tape. The interlayer adhesive layer may attach members contained in the support member SPM.

The filling part SAP may be disposed at an outer side of the support member SPM. The filling part SAP may be disposed between the display module DM and the housing HAU. The filling part SAP may fill a space between the protection layer PF and the housing HAU and fix the protection layer PF.

Also, the electronic device ED according to an embodiment may further include at least one adhesive layer AP2. The adhesive layer AP2 may be disposed between the protection layer PF and the lower module SM. The adhesive layer AP2 may be an optically clear adhesive film (OCA) or an optically clear adhesive resin layer (OCR). However, an embodiment is not limited thereto. For example, the at least one adhesive layer AP2 may have a transmittance of about 80% or less.

The window WM may include a folding part FP and non-folding parts NFP1 and NFP2. The folding part FP may correspond to the folding area FA1 of the electronic device ED. The folding part FP of the window WM may correspond to the folding display part FA-D of the display module DM.

The folding part FP of the window WM may be folded with respect to the first folding axis FX1 (refer to FIG. 3) that is a virtual folding axis extending in one direction or in a direction. A first non-folding part NFP1 and a second non-folding part NFP2 may be spaced apart from each other with the folding part FP therebetween. The folding part FP may be folded with respect to the folding axis FX1 (refer to FIG. 3) extending in the first direction DR1, and the first non-folding part NFP1 and the second non-folding part NFP2 may be spaced apart from each other with the folding part FP in the second direction DR2 perpendicular to the first direction DR1.

The window WM may include a top surface WM-FS and a bottom surface WM-BS, which face each other, and recessed portions HP that are recessed concavely in a direction to the top surface WM-FS from the bottom surface WM-BS, which is adjacent to the display module DM, of the window WM may be defined in the window WM. The concave recessed portions HP may be defined in a portion corresponding to the folding part FP of the bottom surface WM-BS of the window to provide a recessed pattern. The window WM according to an embodiment may include the recessed portion HP that is recessed concavely from one surface or a surface thereof, and the recessed pattern of the recessed portions HP may have a "W" shape or an "M" shape on a plane defined by the second directional axis DR2 and the third directional axis DR3. For example, in an embodiment, a recessed pattern having trenches defined by protruding portions having different heights may be defined in the folding part FP of the window WM.

Figure 5:
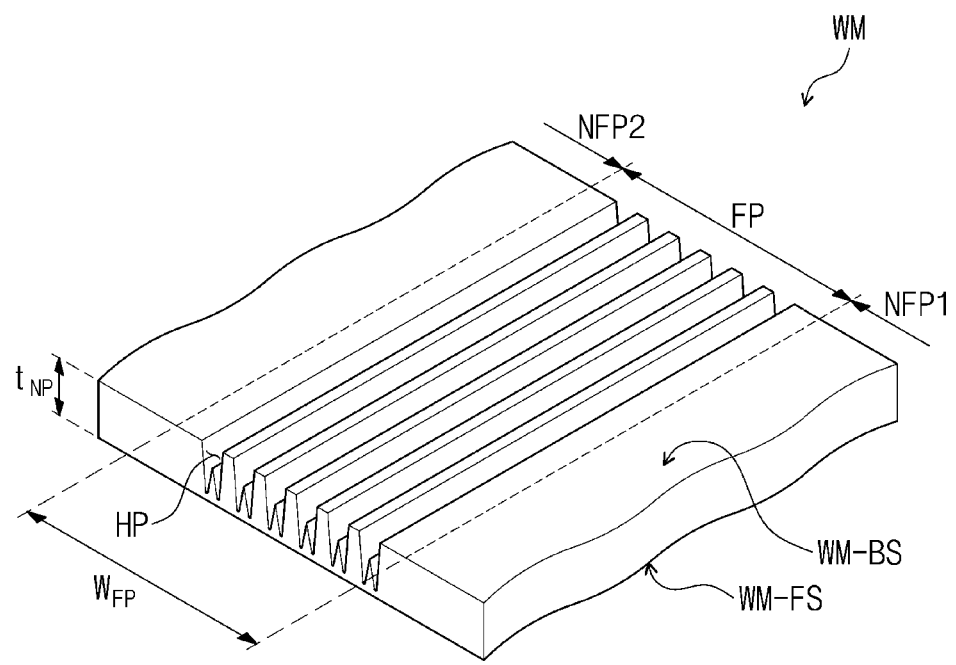
FIG. 5 is a schematic perspective view of a window according to an embodiment.
Figure 5:
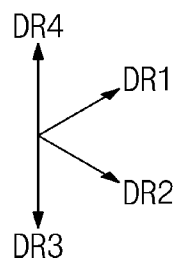
Figure 6A:
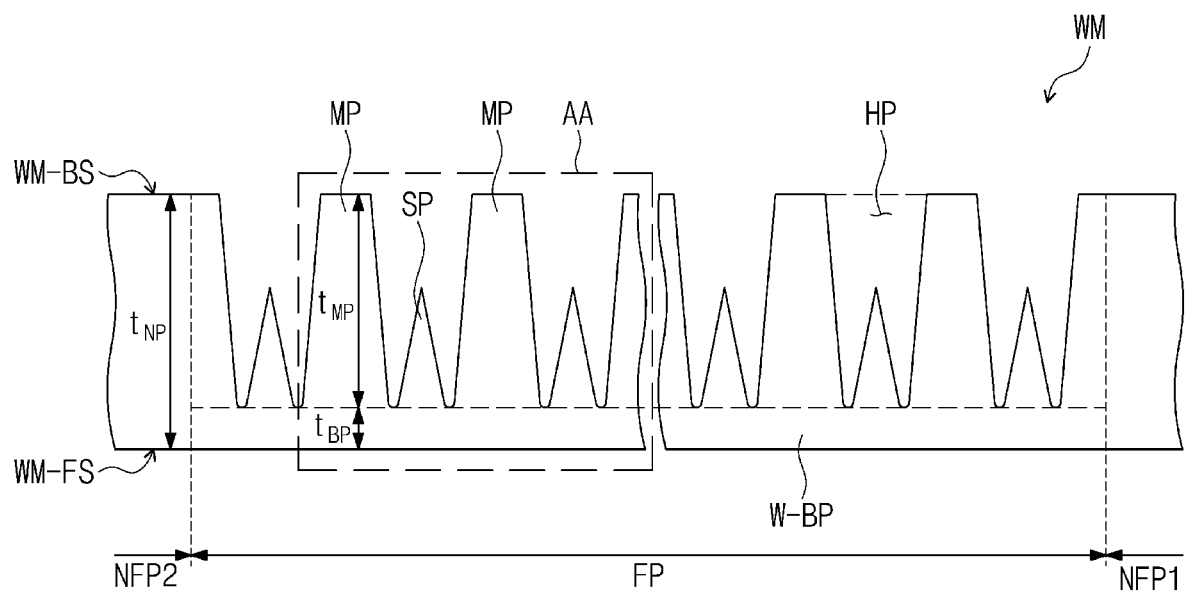
FIG. 6A is a schematic cross-sectional view of the window according to an embodiment.
Figure 6A:
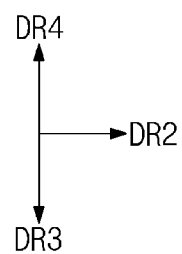
Figure 6B:
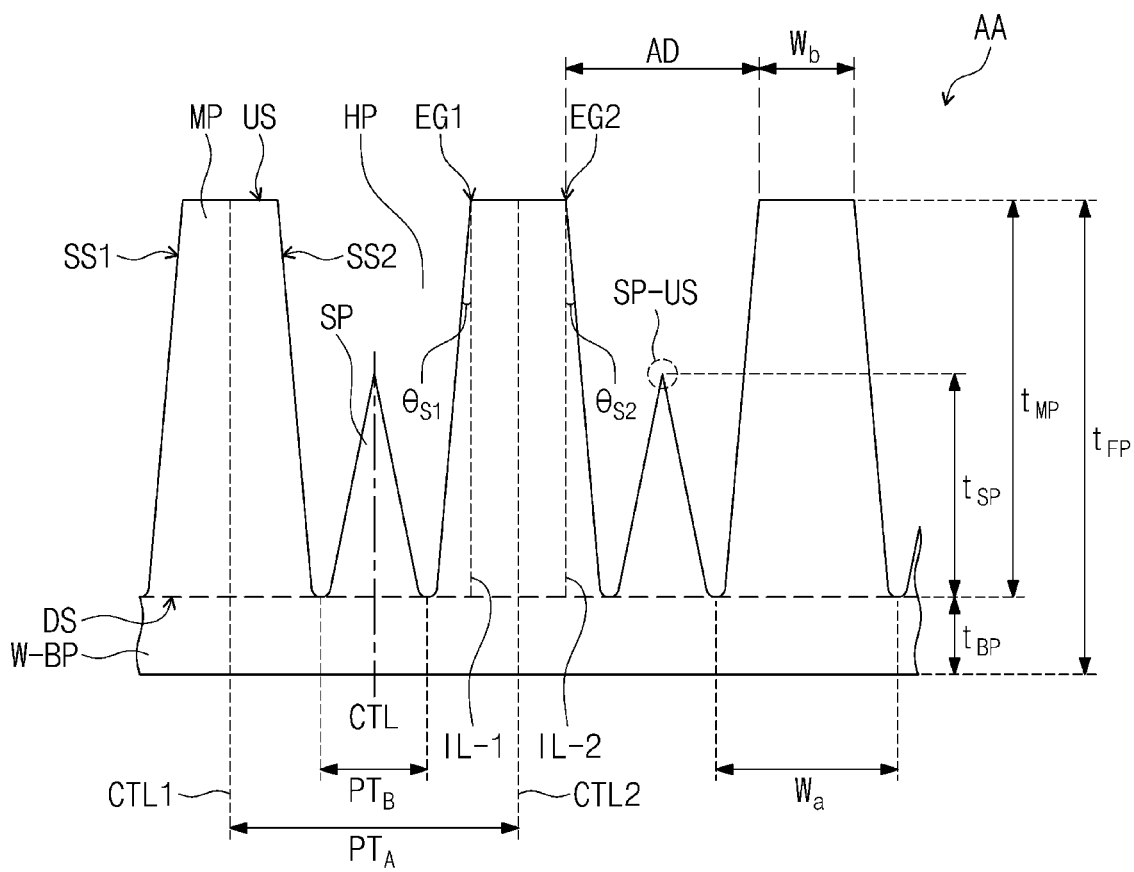
FIG. 6B is a schematic cross-sectional view illustrating the window according to an embodiment.
Figure 6B:
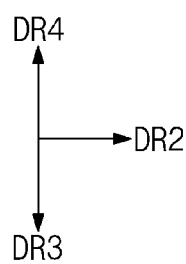

FIG. 5 is a schematic perspective view of the window according to an embodiment. FIGS. 6A and 6B are schematic cross-sectional views each illustrating the window according to an embodiment. FIG. 6B is an enlarged schematic cross-sectional view illustrating portion "AA" of the window according to an embodiment.

The folding part FP of the window WM may include a base portion W-BP, main protruding portions MP disposed on the base portion W-BP, and sub-protruding portions SP disposed on the base portion W-BP. The main protruding portion MP may have a first thickness $t_{MP}$ that is greater than a second thickness $t_{SP}$ of the sub-protruding portion SP.

At least one sub-protruding portion SP may be disposed between neighboring main protruding portions MP in the window WM according to an embodiment. One sub-protruding portion SP may be disposed between two adjacent main protruding portions MP. Also, in an embodiment, two or more sub-protruding portions SP may be disposed between two adjacent main protruding portions MP.

The folding part FP on which the main protruding portions MP and the sub-protruding portions SP are disposed may have a width $W_{FP}$ of about πxr or more in the direction of the second directional axis DR2. Where, the r is a radius of curvature of the folding part. In an embodiment, the folding part FP may have a radius of curvature of about 1 mm or more. Also, in an embodiment, the radius of curvature of the folding part FP may correspond to the radius R of curvature (refer to FIG. 1C) of the electronic device according to an embodiment.

The base portion W-BP may be a portion having a uniform thickness in the entire folding part FP. The base portion W-BP may have a thickness $t_{BP}$ in a range of about 1 μm to about 50 μm. An embodiment may include the base portion W-BP having a thickness in the folding part FP to provide the integrated window WM connected with the non-folding parts NFP1 and NFP2, thereby exhibiting an improved strength in the folding part FP.

Each of the non-folding parts NFP1 and NFP2 may have a thickness $t_{NP}$ that is equal to or less than about 1 mm. For example, each of the non-folding parts NFP1 and NFP2 may have a thickness $t_{NP}$ that is equal to or less than about 0.5 mm.

In an embodiment, a sum $t_{FP}$ of the thickness $t_{BP}$ of the base portion W-BP and the thickness $t_{MP}$ of the main protruding portion MP in the folding part FP may be equal to or less than about 1 mm. The sum $t_{FP}$ of the thickness $t_{SP}$ of the base portion W-BP and the thickness $t_{MP}$ of the main protruding portion MP may correspond to the thickness $t_{NP}$ of each of the non-folding parts NFP1 and NFP2. For example, in an embodiment, the sum of the thickness $t_{BP}$ of the base portion W-BP and the thickness $t_{MP}$ of the main protruding portion MP in the folding part FP may be equal to the thickness $t_{NP}$ of each of the non-folding parts NFP1 and NFP2. Thus, the window WM according to an embodiment may include a portion in the folding part FP, which has a thickness corresponding to the thickness of each of the non-folding parts NFP1 and NFP2, and the folding part FP may exhibit an improved strength against an external impact.

Each of the main protruding portions MP may include a base surface DS adjacent to the base portion W-BP, a flat surface US that is a flat surface facing the base surface DS and parallel to the base portion W-BP, and side surfaces SS1 and SS2 disposed between the base surface DS and the flat surface US.

The flat surface US of the main protruding portion MP may have an extension direction parallel to the first direction DR1. Also, the main protruding portions MP may be spaced apart from each other in the second direction DR2. For example, in an embodiment, the flat surface US of the main protruding portions MP may be arranged or disposed in a substantially stripe shape extending in parallel to the direction of the first directional axis DR1 on a plane defined by the first directional axis DR1 and the second directional axis DR2.

A spaced distance AD between the neighboring main protruding portions MP may be in a range of about 20 μm to about 300 μm. As the proper number of main protruding portions MP are arranged or disposed in the folding part FP so that the spaced distance AD between the main protruding portions is in the range of about 20 μm to about 300 μm, a portion in which the thickness of the folding part FP is maintained at the level of the thickness of each of the non-folding parts NFP1 and NFP2 is contained. Thus, the folding part FP may have an improved impact resistance.

In an embodiment, a width of each of the main protruding portions MP in the second direction DR2 may gradually decrease in a direction from the base surface DS to the flat surface US on a cross-section perpendicular to the base portion W-BP. For example, in an embodiment, on a cross-section defined by the second directional axis DR2 and the fourth directional axis DR4, a width $W_a$ at the base surface DS may be greater than a width $W_b$ at the flat surface US.

Also, in an embodiment, each of inclination angles $\theta_{S1}$ and $\theta_{S2}$ of the side surfaces SS1 and SS2 of the main protruding portion MP may be in a range of about 0° to about 60°. In this specification, the inclination angles $\theta_{S1}$ and $\theta_{S2}$ represents angles between the side surfaces SS1 and SS2 and virtual reference lines IL-1 and IL-2 passing edges EG1 and EG2 of the flat surface US. In an embodiment, the inclination angles $\theta_{S1}$ and $\theta_{S2}$ provided by both the side surfaces SS1 and SS2 may be equal to each other. For example, in an embodiment, the main protruding portion MP may have a shape that is symmetrical with or substantially symmetrical with respect to a virtual center line CTL1 and CTL2 passing a center of the flat surface US.

However, an embodiment is not limited thereto. For example, the inclination angles $\theta_{S1}$ and $\theta_{S2}$ of both the side surfaces SS1 and SS2 may be equal to each other. For example, in an embodiment, the main protruding portion MP may have a shape that is asymmetrical with or substantially asymmetrical with respect to the virtual center line CTL1 and CTL2 passing the center of the flat surface US.

In an embodiment, a pitch $PT_A$ that is an arrangement gap of the main protruding portions MP may be in a range of about 20 μm to about 300 μm. In this specification, the pitch $PT_A$ may be defined as a distance between the virtual center lines CTL1 and CTL2 passing the center of the flat surface US of the neighboring main protruding portions MP. The pitch $PT_A$ of the neighboring main protruding portions MP may be greater than the spaced distance AD between the neighboring main protruding portions MP.

In the window WM according to an embodiment, the folding part FP may include a sub-protruding portion SP having a height different from that of the main protruding portion MP. The sub-protruding portion SP may be disposed on the base portion W-BP and disposed between the main protruding portions MP. In an embodiment, the thickness $t_{SP}$ of the sub-protruding portion SP may be less than the thickness $t_{MP}$ of the main protruding portion MP.

In an embodiment, a ratio between the first thickness $t_{MP}$ of the main protruding portion MP and the second thickness $t_{SP}$ of the sub-protruding portion SP may be in a range of about 1:0.3 to about 1:0.8. For example, the window WM according to an embodiment may relieve a stress in case that folded by increasing the number of the protruding portions in the folding part FP such that at least one sub-protruding portion SP having a relatively small thickness is contained between the main protruding portions MP each having a thickness similar to that of each of the non-folding parts NFP1 and NFP2. Thus, the window WM according to an embodiment may exhibit a characteristic of being readily folded in the folding part FP.

The sub-protruding portion SP may include an upper portion SP-US that is sharp in a direction away from the base portion W-BP. In other words, the sub-protruding portion SP may include an upper portion SP-US in which two sides of the protruding portion SP form a tip of a triangle or a vertex in a direction away from the base portion W-BP. The width of the sub-protruding portion SP in the second direction DR2 may gradually decrease in a direction away from the base portion W-BP. A maximum width $PT_B$ of the sub-protruding portion SP in the second direction DR2 may be in a range of about 1 μm to about 100 μm.

In an embodiment, the sub-protruding portion SP may have a shape that is symmetrical to or substantially symmetrical to the virtual line CTL passing the upper portion SP-US. However, an embodiment is not limited thereto. For example, the sub-protruding portion SP may have a shape that is asymmetrical to or substantially asymmetrical to the virtual line CTL passing the upper portion SP-US.

In the window WM according to an embodiment, recessed portions HP may be defined in the folding part FP. Each of the recessed portions HP may be recessed concavely from one surface or a surface of the window WM and defined between the neighboring main protruding portions MP. The recessed portion HP may be defined by the neighboring main protruding portions MP and at least one sub-protruding portion SP disposed between the main protruding portions MP.

In an embodiment illustrated in FIGS. 6A and 6B, the recessed portion HP defined between two neighboring main protruding portions MP may have a shape that is symmetrical to or substantially symmetrical to the virtual line CTL passing the upper portion SP-US of the sub-protruding portion SP.

The recessed portion HP defined in the window WM according to an embodiment may be provided by a laser processing method or a wet-etching method. For example, the main protruding portion MP and the sub-protruding portion SP of the folding part FP of the window WM may be molded by the laser processing method or the wet-etching method.

The window WM according to an embodiment may relieve a stress in case that folded and exhibit an excellent mechanical property such that the folding part may include the protruding portions having different heights, and a portion of the protruding portions maintains the thickness of the window WM.

The window WM according to an embodiment may improve a folding characteristic thereof by further including the sub-protruding portions in comparison with a case of including only the main protruding portions and increasing the trench portion in the folding part. Also, the window WM according to an embodiment may improve an impact resistance against an external impact in comparison with a case of including only the sub-protruding portions each having a small thickness instead of including the main protruding portions having the same thickness or substantially the same thickness as the non-folding part.

For example, the window WM according to an embodiment may exhibit a satisfactory folding characteristic and an excellent impact resistance by including the folding part FP including all of the main protruding portion MP and the sub-protruding portion SP, which have different heights.

Figure 7:
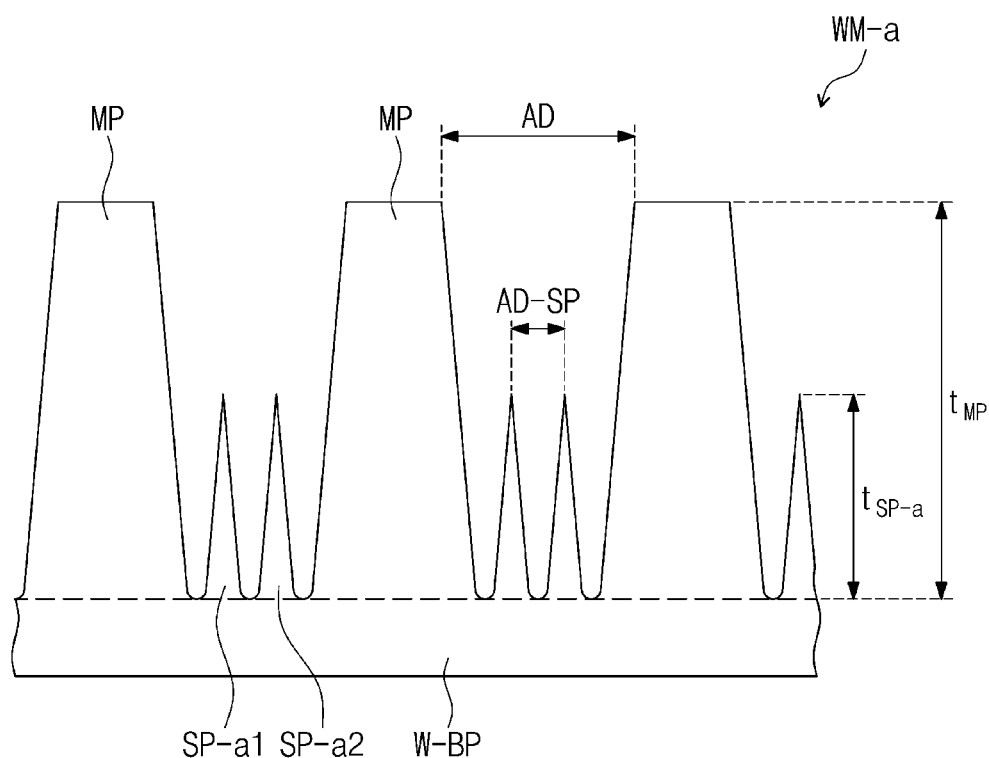
FIG. 7 is a schematic cross-sectional view of a window according to an embodiment.
Figure 7:
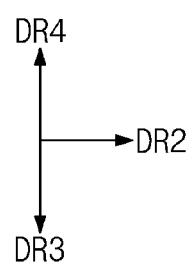
Figure 8:
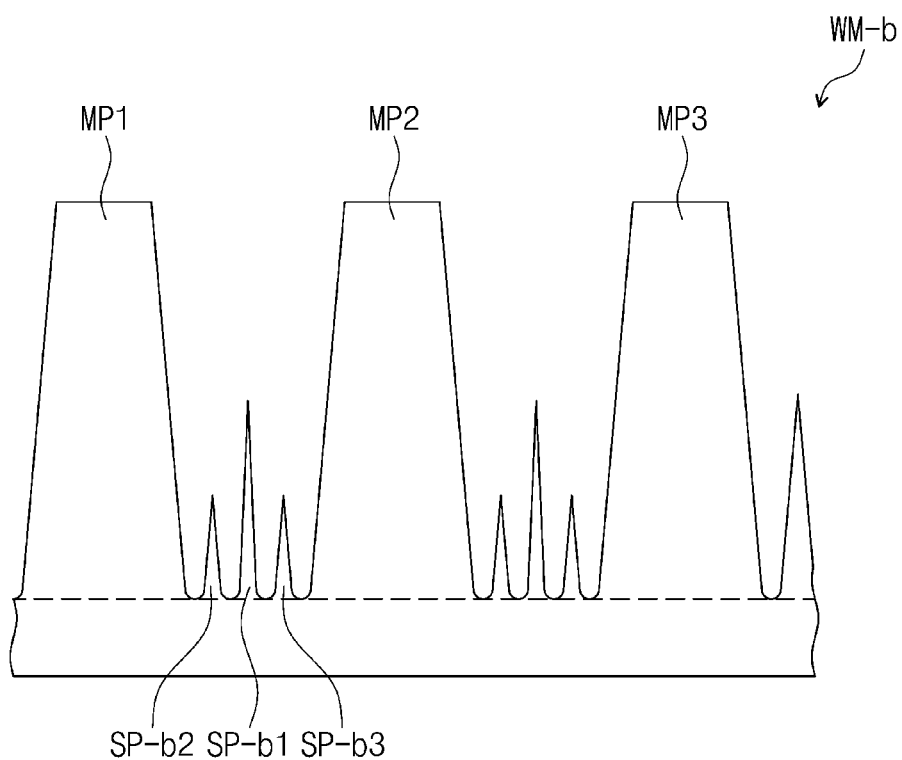
FIG. 8 is a schematic cross-sectional view of a window according to an embodiment.

FIGS. 7 and 8 are schematic cross-sectional views each illustrating a window according to an embodiment. In case that the window according to an embodiment is described with reference to FIGS. 7 and 8, features consistent with those described with reference to FIGS. 1A, 1B, 1C to 6B will not be described again, and only different points will be described. FIGS. 7 and 8 each illustrate an embodiment of a cross-sectional shape of a window in the folding part. FIGS. 7 and 8 may represent a portion corresponding to area "AA" of FIG. 6A.

A window WM-a and WM-b according to an embodiment in FIGS. 7 and 8 may include sub-protruding portions disposed between two neighboring main protruding portions MP.

Referring to FIG. 7, the window WM-a according to an embodiment may include two sub-protruding portions SP-a1 and SP-a2 disposed between two neighboring main protrusion portions MP. Also, referring to FIG. 8, the window WM-b according to an embodiment may include three sub-protruding portions SP-b1, SP-b2, and SP-b3 disposed between two neighboring main protrusion portions MP1 and MP2. In FIGS. 7 and 8, an embodiment of the window is illustrated as an example, and the number of the sub-protruding portions disposed between the two main protruding portions may be equal to or greater than about 4.

In the window WM-a and WM-b including the sub-protruding portions disposed between the two main protruding portions according to an embodiment, all of the sub-protruding portions may have the same cross-sectional shape, or at least one of the sub-protruding portions may have a different cross-sectional shape from that of each of the rest of the same.

In FIG. 7, two sub-protruding portions SP-a1 and SP-a2 disposed between the two main protruding portions MP have the same shape and the same height as each other. For example, in an embodiment, the two sub-protruding portions SP-a1 and SP-a2 disposed between the two main protruding portions MP spaced by a first distance AD from each other may have the same thickness $t_{SP-a}$. The two sub-protruding portions SP-a1 and SP-a2 spaced by a second distance AD-SP from each other may have the same shape on a cross-section defined by the second directional axis DR2 and the fourth directional axis DR4. However, an embodiment is not limited thereto. For example, the two sub-protruding portions SP-a1 and SP-a2 may have different thicknesses and shapes from each other within a range having a thickness less than a thickness $t_{MP}$ of the main protruding portion MP.

For example, in an embodiment, the first distance AD may be in a range of about 20 μm to about 300 μm, and the second distance AD-SP may be in a range of about 1 μm to about 100 μm. However, an embodiment is not limited thereto.

The sub-protruding portion in a case in which the sub-protruding portions SP-a1 and SP-a2 are disposed between the main protruding portions MP may have a thickness $t_{SP-a}$ less than a thickness $t_{SP}$ of the sub-protruding portion in a case in which one sub-protruding portion SP is disposed between the main protruding portions MP like the window WM according to an embodiment in FIG. 6B or the like within the spirit and the scope of the disclosure. For example, in an embodiment, as the number of the sub-protruding portions disposed between the main protruding portions MP increases, the thickness of the sub-protruding portion may decrease. However, an embodiment is not limited thereto.

The window WM-b according to an embodiment in FIG. 8 may include the three sub-protruding portions SP-b1, SP-b2, and SP-b3 disposed between the two neighboring main protrusion portions MP1 and MP2. The window WM-b according to an embodiment may include a first sub-protruding portion SP-b1 disposed between a first main protruding portion MP1 and a second main protruding portion MP2, which are neighbored to each other, a second sub-protruding portion SP-b2 disposed between the first main protruding portion MP1 and the first sub-protruding portion SP-b1, and a third sub-protruding portion SP-b3 disposed between the second main protruding portion MP2 and the first sub-protruding portion SP-b1.

In an embodiment of FIG. 8, the second sub-protruding portion SP-b2 and the third sub-protruding portion SP-b3 may be symmetrical with respect to the first sub-protruding portion SP-b1. For example, the second sub-protruding portion SP-b2 and the third sub-protruding portion SP-b3 may have the same shape and the same thickness. Also, the first sub-protruding portion SP-b1 may have a thickness greater than that of each of the second sub-protruding portion SP-b2 and the third sub-protruding portion SP-b3.

However, an embodiment is not limited thereto. For example, all of three sub-protruding portions SP-b1, SP-b2, and SP-b3 may have the same thickness or different thicknesses. Unlike as illustrated in FIG. 8, the first sub-protruding portion SP-b1 and the second sub-protruding portion SP-b2 may have the same thickness, and the third sub-protruding portion SP-b3 may have a different thickness.

Although the sub-protruding portions SP-b1, SP-b2, and SP-b3 disposed between the first main protruding portion MP1 and the second main protruding portion MP2 has the same arrangement shape as the sub-protruding portions SP-b1, SP-b2, and SP-b3 disposed between the second main protruding portion MP2 and the third main protruding portion MP3 in FIG. 8, an embodiment is not limited thereto. For example, the sub-protruding portions disposed between the first main protruding portion MP1 and the second main protruding portion MP2 may have a different arrangement shape from that of the sub-protruding portions disposed between the second main protruding portion MP2 and the third main protruding portion MP3.

Although an embodiment in case that sub-protruding portions are disposed between two main protruding portions is illustrated as an example in FIGS. 7 and 8, the number of the sub-protruding portions, arrangement distances between the sub-protruding portions, shapes of the sub-protruding portions, and thicknesses of the sub-protruding portions may be variously combined according to a folding characteristic and a strength characteristic required by the window.

For example, the window according to an embodiment may exhibit the satisfactory folding characteristic and the excellent impact resistance by including the main protruding portions and the sub-protruding portions each having a thickness less than that of each of the main protruding portions.

The window WM-a and WM-b described with reference to FIGS. 7 and 8 may be used for the window WM of the electronic device ED and ED-a according to an embodiment described with reference to FIGS. 1A to 4.

The electronic device according to an embodiment may exhibit the satisfactory folding characteristic and the excellent impact resistance by including the window disposed on the display module and including the main protruding portions on a surface adjacent to the display module in the folding part and at least one sub-protruding portion having a thickness less than that of each of the main protruding portions.

Also, the window according to an embodiment may exhibit the satisfactory folding characteristic and the excellent strength characteristic such that the folding part may include the recessed portion recessed concavely from one surface or a surface thereof, and the recessed portion defined by the main protruding portions and at least one sub-protruding portion provides a recessed pattern having a "W" or "M" shape.

The window according to an embodiment may exhibit the satisfactory folding characteristic and the excellent impact resistance by including two or more kinds of patterns having different sizes and shapes in the folding part.

The electronic device according to an embodiment may exhibit the satisfactory folding characteristic and the excellent mechanical property by including the window disposed on the display module and including two or more kinds of patterns having different sizes and shapes.

Although embodiments of the disclosure have been described, it is understood that the disclosure should not be limited to these embodiments but various changes and modifications can be made by one of ordinary skill in the art within the spirit and scope of the disclosure as hereinafter claimed.

Hence, the scope of the disclosure shall be determined by the scope of the accompanying claims.

What is claimed is:

1. A window of an electronic device, the window comprising:
    a folding part extending in a first direction;
    a first non-folding part and a second non-folding part spaced apart from each other with the folding part disposed between the first non-folding part and the second non-folding part in a second direction perpendicular to the first direction,
    wherein the window is tempered glass substrate which is optically clear and disposed on a display module of the electronic device and facing an image displayed from the display module, and
    wherein the folding part of the window comprises:
    a base portion that is foldable;
    main protruding portions disposed on the base portion and facing the image, each of the main protruding portions having a first thickness extending in a third direction perpendicular to the first direction and the second direction, and spaced apart from each other in the second direction; and
    at least one sub-protruding portion facing the image and having a second thickness extending in the third direction and less than the first thickness of each of the main protruding portions and disposed between the main protruding portions on the base portion.

2. The window of claim 1, wherein
    each of the main protruding portions comprises on a cross-section perpendicular to the base portion:
    a base surface adjacent to the base portion;
    a flat surface facing the base surface and parallel to the base portion; and
    a side surface disposed between the base surface and the flat surface.

3. The window of claim 2, wherein a width of each of the main protruding portions in the second direction decreases in the third direction from the base surface to the flat surface on the cross-section perpendicular to the base portion.

4. The window of claim 2, wherein the flat surface of each of the main protruding portions has an extension direction parallel to the first direction on a plane parallel to the base portion.

5. The window of claim 2, wherein an inclination angle of the side surface with respect to a virtual reference line passing an edge of the flat surface is in a range of about 0° to about 60°.

6. The window of claim 1, wherein
one of the at least one sub-protruding portion is disposed between neighboring main protruding portions of the main protruding portions, and
a spaced distance between the main protruding portions in the second direction is in a range of about 20 µm to about 300 µm.

7. The window of claim 1, wherein the at least one sub-protruding portion comprises an upper portion that forms a vertex in a direction away from the base portion.

8. The window of claim 7, wherein a recessed portion between neighboring main protruding portions of the main protruding portions is symmetrical to a virtual line passing the upper portion of the at least one sub-protruding portion.

9. The window of claim 7, wherein a maximum width of the at least one sub-protruding portion in the second direction is in a range of about 1 µm to about 100 µm on a cross-section perpendicular to the base portion.

10. The window of claim 1, wherein the non-folding part has a thickness in the third direction equal to a sum of a thickness of the base portion and a thickness of one of the main protruding portions.

11. The window of claim 1, wherein the base portion has a thickness in a range of about 1 µm to about 50 µm.

12. The window of claim 1, wherein a ratio between the first thickness of each of the main protruding portions and the second thickness of the at least one sub-protruding portion is in a range of about 1:0.3 to about 1:0.8.

13. The window of claim 1, wherein
at least one sub-protruding portion includes sub-protruding portions that are disposed between neighboring main protruding portions of the main protruding portions, and
all of the sub-protruding portions have an identical shape on a cross-section perpendicular to the base portion, or
at least one of the sub-protruding portions has a shape different from that of each of remaining sub-protruding portions on a cross-section perpendicular to the base portion.

14. The window of claim 13, wherein a spaced distance between the sub-protruding portions in the second direction is in a range of about 1 µm to about 100 µm.

15. The window of claim 13, wherein
the sub-protruding portions comprise:
a first sub-protruding portion disposed between a first main protruding portion and a second main protruding portion neighboring each other;
a second sub-protruding portion disposed between the first main protruding portion and the first sub-protruding portion; and
a third sub-protruding portion disposed between the second main protruding portion and the first sub-protruding portion, and
the second sub-protruding portion and the third sub-protruding portion are symmetrical to each other with respect to the first sub-protruding portion.

16. The window of claim 1, wherein a width of the folding part in the second direction in a plan view is equal to or greater than about π×r, wherein the r is a radius of curvature of the folding part.

17. The window of claim 1, wherein
the at least one sub-protruding portion includes:
a first sub-protruding portion having the second thickness and disposed between a first main protruding portion and a second main protruding portion neighboring each other; and
a second sub-protruding portion having a third thickness in the third direction and less than the second thickness, the second sub-protruding portion disposed between the first sub-protruding portion and the first main protruding portion.

18. The window of claim 17, wherein
the at least one sub-protruding portion further includes a third sub-protruding portion having the third thickness in the third direction and disposed between the first sub-protruding portion and the second main protruding portion.

19. The window of claim 1, wherein the base portion extends continuously in the second direction from the first non-folding part to the second non-folding part.

20. The window of claim 1, wherein the base portion is foldable about a radius of curvature of the folding part.

21. The window of claim 1, wherein the base portion does not overlap the first non-folding part or the second non-folding part.

22. An electronic device comprising:
a display module comprising:
a folding display part extending in a first direction, and
a first non-folding display part and a second non-folding display part spaced apart from each other with the folding display part disposed between the first non-folding display part and the second non-folding display part in a second direction perpendicular to the first direction; and
a window disposed at a top of the display module and facing an image displayed from the display module, the window comprising:
a folding part corresponding to the folding display part of the display module; and
a first non-folding part and a second non-folding part spaced apart from each other with the folding part disposed between the first non-folding display part and the second non-folding display part,
wherein the folding part of the window comprises:
a base portion that is foldable;
main protruding portions protruding from the base portion toward the display module and facing the image, each of the main protruding portions having a first thickness extending in a third direction perpendicular to the first direction and the second direction, and spaced apart from each other in the second direction; and
at least one sub-protruding portion having a second thickness extending in the third direction and less than the first thickness of each of the main protruding portions, protruding from the base portion toward the display module and facing the image, and disposed between the main protruding portions.

23. The electronic device of claim 22, further comprising:
an adhesive layer that fills a space between the display module and the window.

24. The electronic device of claim 22, wherein a distance between top surfaces of the window facing each other is less than a distance between top surfaces of the display module facing each other in case that the display module and the window are folded.

25. The electronic device of claim 22, wherein
the first non-folding part and the second non-folding part face each other with the folding part disposed between the first non-folding part and the second non-folding part in case that the display module and the window are folded, and the folding part has a radius of curvature of about 1 mm or more.

26. The electronic device of claim 22, wherein each of the main protruding portions comprises on a cross-section perpendicular to the base portion:
a base surface adjacent to the base portion;
a flat surface facing the base surface and parallel to the base portion; and
a side surface disposed between the base surface and the flat surface, and the flat surface is adjacent to the display module.

27. The electronic device of claim 22, wherein the non-folding part has a thickness in the third direction equal to a sum of a thickness of the base portion and a thickness of one of the main protruding portions.

28. The electronic device of claim 22, wherein the folding part comprises a recessed part recessed in a direction away from a surface of the window which is adjacent to the display module, and formed by the main protruding portions and the at least one sub-protruding portion.

29. The electronic device of claim 22, wherein the window is tempered glass substrate which is optically clear.

* * * * *

UNITED STATES PATENT AND TRADEMARK OFFICE
CERTIFICATE OF CORRECTION

| | | |
|---|---|---|
| PATENT NO. | : 12,212,701 B2 | Page 1 of 1 |
| APPLICATION NO. | : 17/527630 | |
| DATED | : January 28, 2025 | |
| INVENTOR(S) | : Kyung-Man Kim | |

It is certified that error appears in the above-identified patent and that said Letters Patent is hereby corrected as shown below:

On the Title Page

Item (73) Assignee, Please change "SAMSUNG DISPLAY CO., LTD.; KILE PARK REED &HOUTTEMAN PLLC" to --SAMSUNG DISPLAY CO., LTD.; YONGIN-SI (KR)--.

Signed and Sealed this
Fifteenth Day of April, 2025

Coke Morgan Stewart
*Acting Director of the United States Patent and Trademark Office*